United States Patent [19]
Smith

[11] Patent Number: 4,867,474
[45] Date of Patent: Sep. 19, 1989

[54] ADAPTIVE VEHICLE SUSPENSION SYSTEM

[75] Inventor: Stanley E. Smith, Dayton, Ohio

[73] Assignee: General Motors Corporation, Detroit, Mich.

[21] Appl. No.: 289,857

[22] Filed: Dec. 27, 1988

Related U.S. Application Data

[63] Continuation-in-part of Ser. No. 123,812, Nov. 23, 1987.

[51] Int. Cl.$^4$ .............................................. B60G 17/08
[52] U.S. Cl. ..................................... 280/699; 267/32; 280/707; 280/712
[58] Field of Search ........................... 267/31, 32, 241; 280/692, 697, 699, 662, 710, 712, 6.12

[56] References Cited

U.S. PATENT DOCUMENTS

| | | | |
|---|---|---|---|
| 673,682 | 5/1901 | Humphreys | 267/32 |
| 2,085,006 | 6/1937 | Coleman | 280/697 |
| 3,042,392 | 7/1962 | Schmitz et al. | 267/31 |
| 3,063,732 | 11/1962 | Harbers et al. | 280/712 |
| 3,262,711 | 7/1966 | Behles | 280/6.1 |
| 3,730,550 | 5/1973 | Thaxton | 267/31 X |
| 4,433,833 | 2/1984 | Tabe et al. | 267/18 |
| 4,614,359 | 9/1986 | Lundin et al. | 280/699 |
| 4,625,993 | 12/1986 | Williams et al. | 280/707 |
| 4,625,994 | 12/1986 | Tanaka et al. | 280/707 |
| 4,643,447 | 2/1987 | Rogers | 280/712 |

FOREIGN PATENT DOCUMENTS

| | | | |
|---|---|---|---|
| 111944 | 6/1984 | European Pat. Off. | 280/710 |
| 34812 | 10/1929 | France | 280/692 |
| 11367 | of 1896 | United Kingdom | 267/31 |

Primary Examiner—Charles A. Marmor
Assistant Examiner—Michael Mar
Attorney, Agent, or Firm—R. L. Phillips

[57] ABSTRACT

An adaptive vehicle suspension assembly includes a transverse leaf spring mounted in series with pneumatic springs at the front and rear wheels of a motor vehicle. A control circuit includes inlet and exhaust solenoid valves to control the flow of pressurized air into or out of the pneumatic springs, providing variable spring rate and vehicle height. Vehicle sensor switch provides control of the operation of the solenoid valves in response to sensed vehicle height increasing or decreasing the spring rate and providing optimum vehicle ride, load and cornering control.

2 Claims, 3 Drawing Sheets

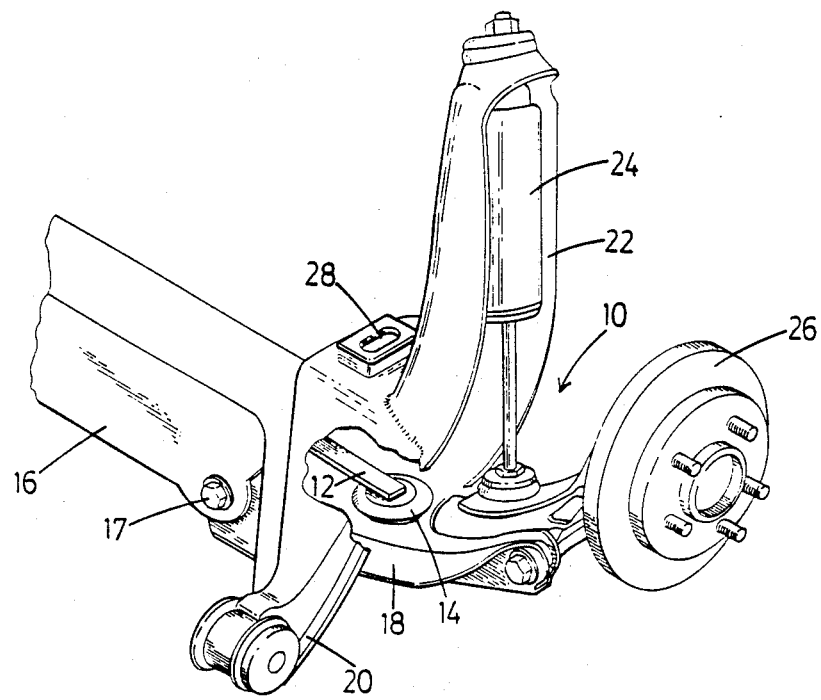
FIG. 1
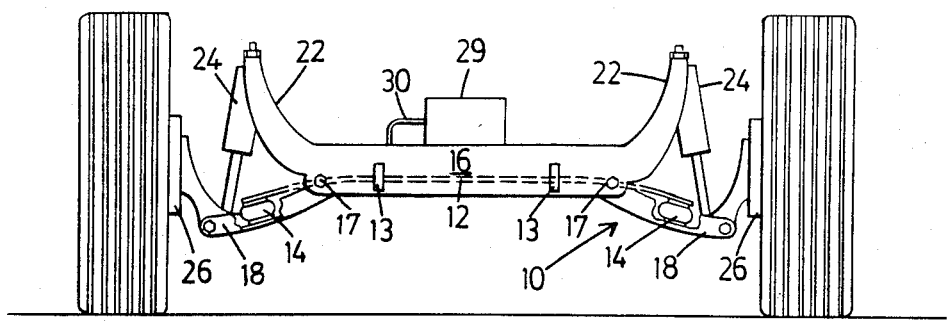
FIG. 2
FIG. 3
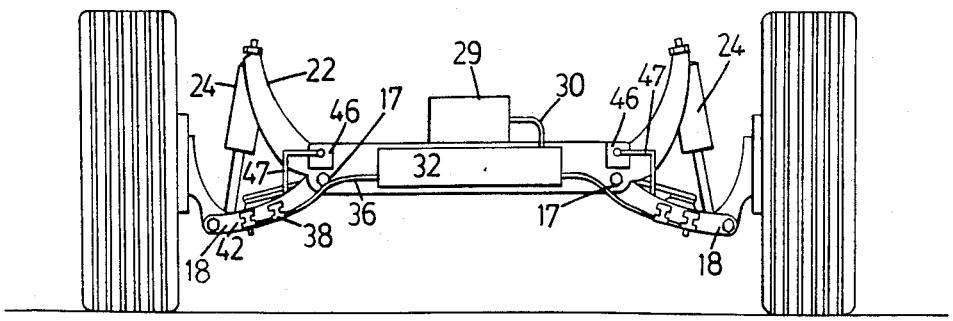

ADAPTIVE VEHICLE SUSPENSION SYSTEM

This is a Continuation-in-part of Ser. No. 123,812 filed Nov. 23, 1987.

TECHNICAL FIELD

The present invention relates generally to a vehicle suspension and, more particularly, an adaptive vehicle suspension system designed to provide enhanced ride characteristics, as well as improved automatic load leveling and cornering control.

BACKGROUND OF THE INVENTION

A variety of vehicle suspension systems providing variable height and/or position control have been developed. U.S. Pat. No. 3,262,711 to Behles discloses a suspension leveling device that utilizes hydraulic/pneumatic spring elements to provide level control. Spring action to absorb bumps and jolts from the road is limited to the single action of the pneumatic portion of the springs. Although a spring element is provided at each corner of the vehicle, the elements work in tandem to position either axle. Accordingly, only limited fore and aft adjustment is available. Further, the system fails to provide any lateral (side-to-side) control. Thus, positive cornering control is simply not possible. Further, lateral vehicle stability, especially at highway speeds and in cross wind conditions, leaves much to be desired.

U.S. Pat. No. 4,625,993 assigned to Lotus discloses a vehicle suspension system including double acting hydraulic actuators at each wheel. These hydraulic actuators are mounted in parallel with the suspension spring assembly. This arrangement inherently provides relatively stiff ride characteristics since the hydraulic fluid is incompressible. The hydraulic actuators thus are designed to control vehicle heave, pitch and roll characteristics exclusively. The system includes a central computer, accelerometers mounted at each wheel and linear variable differential transformers mounted at each wheel. While this system is thus designed to provide some enhanced control characteristics, it hinders the ride characteristics, and in addition it is complicated and expensive to fit onto vehicles.

U.S. Pat. No. 4,625,994 assigned to Mitsubishi discloses a vehicle suspension apparatus including air spring chambers at each wheel. The air springs allow for a smoother, softer ride over generally small amplitude bumps, but there is no back-up spring action to absorb the larger amplitude bumps and jolts and to stabilize the suspension. Furthermore, this system is designed and implemented to work in a position control mode or a height control mode. The flexibility and utility of this system is limited, however, snce employment of these modes is mutually exclusive. As in the Lotus system, the design is highly complicated and expensive.

Another recently developed adaptive suspension substitutes pneumatic springs in the place of coil springs on a MacPherson strut front suspension. The pneumatic springs are thus the sole source of spring action, as in the Mitsubishi system. The pneumatic springs also provide a means to control vehicle height. In order to implement position or cornering control, this system includes means to change the shock absorber valving. The use of an onboard computer is required as are inputs from a steering wheel position sensor. Here again, this system is complicated and requires computer control in response to numerous vehicle inputs.

Yet another recently developed suspension system includes single air bags mounted on quarter elliptic composite leaf springs. The air bags act in parallel with the leaf springs. Thus for all road conditions, both the air bag and the leaf spring must flex. This inherently provides a stiffer and less responsive suspension system especially for the smaller amplitude bumps. This system is designed to be used on small trucks and is specifically intended to provide low loading heights. Thus, this prior art system provides load control only with little or no emphasis on ride quality.

A need, therefore, exists for an improved adaptive vehicle suspension system that has a major emphasis on ride quality, but also provides both automatic vehicle load and cornering control. Such a system would provide substantially improved ride and vehicle control characteristics, and yet be relatively economical to implement.

SUMMARY OF THE INVENTION

Accordingly, it is a primary object of the present invention to provide an adaptive suspension assembly overcoming the limitations and disadvantages of the prior art.

Another object of the present invention is to provide an adaptive suspension assembly providing desirable ride characteristics and highly reliable operation.

Another object of the present invention is to provide an adaptive suspension assembly having a pneumatic/leaf spring combination in series to provide improved sensitivity in the springing action for a softer ride for small amplitude bumps and back-up stiffer action for large amplitude conditions.

Another object of the present invention is to provide an adaptive suspension assembly which is responsive to vehicle operating conditions providing improved handling and cornering control.

An additional object of the present invention is to provide an adaptive vehicle suspension assembly which senses and acts in response to vehicle load conditions.

Yet another object of the present invention is to provide an adaptive vehicle suspension assembly which provides for fail safe operation.

Still another object of the present invention is to provide an adaptive all wheel vehicle suspension assembly which provides for adaptive spring rate and vehicle height changes in response to sensed driving conditions.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an adaptive suspension for the front and/or the rear of a vehicle includes a leaf spring and pneumatic spring in series and provides improved ride quality as well as control of vehicle position and attitude characteristics. The control circuit for the system automatically controls vehicle height.

The preferred embodiment of the adaptive vehicle suspension system selected to illustrate the invention comprises front and rear suspension installations each having a composite leaf spring that is mounted transverse to the vehicle frame at spaced intermediate points and has ends that are each supported upon a variable pressure pneumatic spring carried by a suspension arm at the respective road wheel.

The mounting of the transverse leaf spring and pneumatic spring in series both front and rear of the vehicle produces a spring combination that is superior in both ride and control. Advantageously, the series spring configuration allows the smaller amplitude bumps on the road to be absorbed without bringing the leaf spring into full action. The leaf spring in effect backs up the pneumatic spring to accommodate the larger amplitude requirements. For intermediate springing action, the pneumatic/leaf spring combination acts in a unique manner to provide superior ride quality without sacrificing stability.

This series spring configuration also provides assured suspension operation. In the unlikely event of collapse of the pneumatic springs, the transverse leaf spring continues to provide limited suspension action. This is because upon total deflation of the pneumatic spring, the transverse leaf spring is in essence in direct engagement with the suspension arm.

In the preferred embodiment of this invention, each spring contributes equally to the overall suspension travel. In other words, upon collapse of the pneumatic springs, the leaf spring still provides approximately 50% suspension travel.

The vehicle suspension assembly is designed to isolate the pneumatic springs from lateral loads. This isolation is accomplished by providing a pivoting suspension arm upon which the pneumatic spring is mounted. The end of the transverse leaf spring rests on top of the pneumatic spring.

As a part of the rear frame and suspension system illustrated as the preferred embodiment of the invention, a stabilizing arm extends forwardly from the cross frame member and connects to the main frame rails. The suspension arm is pivoted to the cross frame member. This arrangement resists the twisting moment on the cross frame member and improves the lateral stability of the vehicle. The body of the vehicle is anchored on top of the arm at its juncture with the frame member.

In the suspension control circuit, an air pressure source provides pressurized air to inflate the pneumatic springs in response to vehicle operating conditions. Inflation and deflatoion of the pneumatic springs is controlled by the use of a height sensor switch that in turn controls inlet and exhaust solenoid valves.

In operation, the control circuit first senses and controls the vehicle height at each wheel. For example, when the vehicle is loaded with passengers the additional weight causes increased deflection of the springs thereby lowering the vehicle height. The system detects this and directs the opening of the inlet solenoid valves to the pneumatic springs. As the air pressure builds in the springs, the vehicle height increases. When the springs have inflated sufficiently to return the vehicle to its normal operating height, the height sensor switch shuts off the flow of pressurized air by closing the solenoid valves.

Vehicle height at each wheel can be changed independently. Thus, if more load is put on one side than the other, only the appropriate pneumatic spring is inflated to level the vehicle. Furthermore, during unusual vehicle maneuvering providing dynamic uneven loading situations, such as during hard vehicle cornering, one side of the vehicle may lower with respect to the other. The system senses this and responds by admitting pressurized air to the springs on the lower side. This instantly increases the height on that side causing the vehicle to once again level itself and providing improved cornering control.

Once the load is removed, or the cornering maneuver is completed and thus the vehicle height exceeds that of the desired normal operating height, the control circuit detects this condition and opens the exhaust solenoid valve(s). This allows the pneumatic spring to partially deflate, lowering the suspension height.

In another important aspect of this invention, addition of air to the pneumatic spring increases the spring rate. By definition, as the spring rate increases, the deflection of the spring for the same input force decreases. Accordingly, the higher the spring rate, the less suspension deflection results. The suspension system has a low, initial overall spring rate due to the pneumatic spring, and due to combining the leaf spring in series. As the air pressure to the air spring increases, the spring rate correspondingly increases. As the road roughness increases (larger bumps) the leaf springs are brought more into action, also increasing the spring rate. This provides a better balance of ride comfort versus ride control than is obtainable by a conventional constant rate spring system, or systems with parallel spring components.

To illustrate, assume the vehicle suddenly hits a bump. If the bump is of a small amplitude, the air spring at relatively low pressure absorbs the jolt giving a very desirable soft feeling ride. Upon receiving a larger amplitude jolt, the vehicle suspension suddenly deflects further bringing the leaf spring into action. This results in an increased spring rate and maximum ride/control combination is obtained. Finally, if cornering or other heavy loading is involved when the springing action is required, the control circuit senses this additional deflection, and provides instantaneous entry of more pressurized air into one or more of the pneumatic springs thereby increasing the spring rate. As the spring rate increases, the total suspension deflection decreases thereby allowing the vehicle to smoothly take bumps without excessive body movement.

When the vehicle suspension no longer exhibits a need for increased spring rate, the increased pressure in the pneumatic spring is released. This instantaneously lowers the spring rate, and depending on the level of pressure released, simultaneously lowers the vehicle height. In this manner, the vehicle suspension assembly constantly monitors vehicle operating conditions and responds by changing vehicle spring rate and/or vehicle height and, consequently, provides optimum ride control and ride quality.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modifications and various, obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrates several aspects of the present invention and together with the description serves to explain the principles of the invention. In the drawings:

FIG. 1 is a perspective cut-away view of the suspension system of the present invention at one rear wheel;

FIG. 2 is a representation of the adaptive vehicle suspension system as installed on the rear of a vehicle and as viewed from the front;

FIG. 3 is rear view of the adaptive suspension system of FIG. 2; and

DETAILED DESCRIPTION OF THE INVENTION

Figure 4:
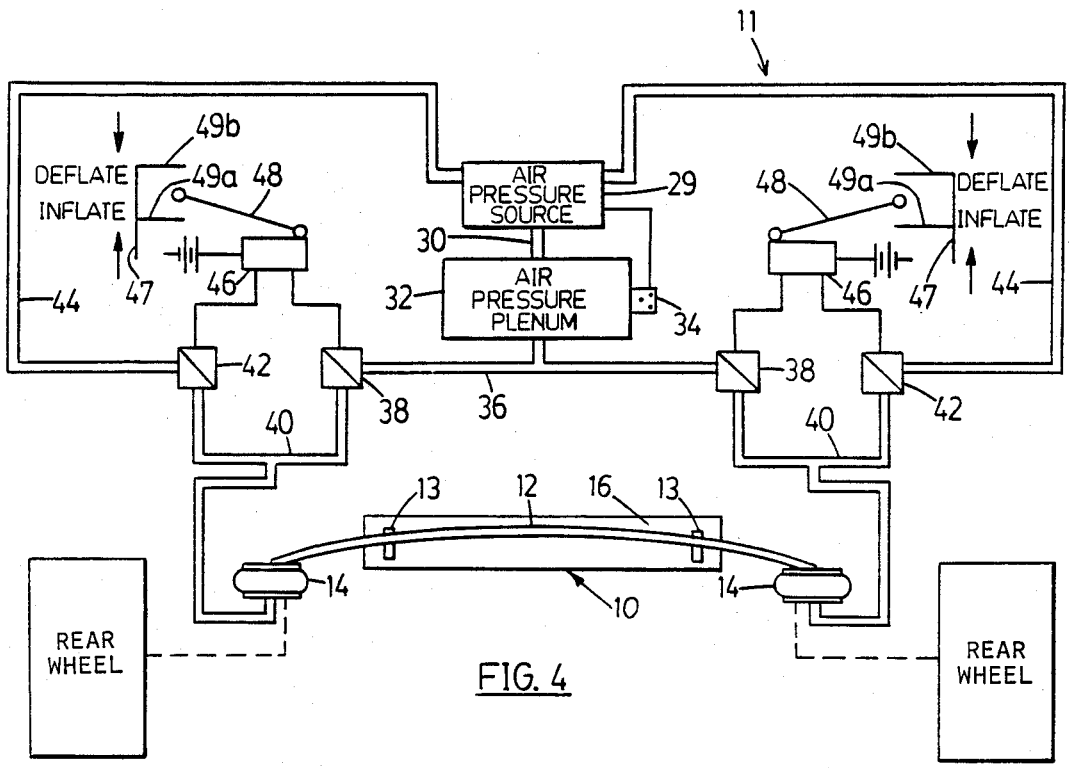
FIG. 4 is a schematic representation of the control circuit for the rear suspension pneumatic/composite spring combination in FIGS. 1-3.

Reference is now made to the drawing FIGS. 1-4 showing the adaptive suspension system for the rear of a typical passenger vehicle. The spring combination of the invention broadly comprises a leaf spring and pneumatic spring cooperating in series at each of the vehicle wheels. The dynamic characteristics of the adaptive suspension system of the invention may be adjusted to meet the specific vehicle application. As a result, and as will become more apparent below, the desired load and cornering cntrol, as well as the optimum spring rate, are automatically obtained instantaneously in response to vehicle loading/operating conditions.

The adaptive suspension assembly 10 at the rear of the vehicle includes a transverse composite leaf spring 12. This leaf spring is mounted transverse to the vehicle frame upon intermediate mounting blocks 13, as shown in FIGS. 2 and 4, which are in turn mounted upon the cross frame membe 16. The respective ends of the transverse composite spring 12 rest upon, and thus the rear of the vehicle is supported by, a variable pressure pneumatic spring 14. The pneumatic spring 14 is securely mounted to a pivoted suspension arm 18 at each rear wheel. Accordingly, springing action of the springs 12, 14 follows the up and down movement of the respective pivoted suspension arms 18.

The mounting of the transverse leaf spring 12 and pneumatic spring 14 in series at each rear wheel produces a spring combination that is superior in both ride and control characteristics. This is because the series spring configuration allows the small amplitude bumps on the road to be absorbed by the pneumatic spring 14 without bringing the transverse leaf spring 12 into full action. The transverse leaf spring 12 in effect backs up the pneumatic spring 14 to accommodate larger amplitude requirements. For intermediate springing action, the penumatic/transverse leaf spring combination acts in an unique manner to provide superior ride quality without sacrificing stability.

A stablizing arm 20 is provided at each rear wheel as shown in FIG. 1, and extends forwardly from the cross frame member 16, connecting to the main frame rails (not shown). The suspension arm 18 at each rear wheel is pivoted to the cross frame member 16 by a suspension pivot bolt 17. See FIGS. 1 and 2. A shock absorber 24 and shock tower 22 are also provided at each rear wheel as in a standard suspension setup to provide suspension damping, improving ride and control characteristics. And the vehicle road wheels are mounted to the respective brake rotor/wheel hub assemblies 26. In addition, a body mounting block 28 (see FIG. 1) is attached to each arm 20 at the connection point with the frame member 16, and facilitates mounting the vehicle body on the frame.

The rear spring arrangement is controlled by a suspension control circuit 11 shown in FIG. 4. The circuit comprises an air pressure source 29 that provides pressurized air to inflate the pneumatic springs 14 in response to vehicle operating conditions. Inflation and deflation of each pneumatic spring 14 is controlled by the use of a separate height sensor switch 46 in an electrical subcircuit. This height sensor switch 46 controls the operation of inlet and exhaust solenoid valves 38, 42.

More specifically, the air pressure source 29 provides pressurized air to an air pressure plenum 32 through an inlet line 30. The operation of the source 29 is controlled by an air pressure switch 34 which senses the air pressure in the plenum 32.

If, during operation, the switch 46 is operated to open the inlet solenoid valve 38, pressurized air flows along air inlet line 36, through the opened inlet solenoid valve 38, through an inlet/exhaust line 40 and into the respective pneumatic spring 14. Conversely, if the switch 46 of the control circuit 11 opens the exhaust solenoid valve 42, air pressure in the pneumatic spring 14 is allowed to return along the spring inlet/exhaust line 40 and through the air exhaust line 44, ultimately returning to the suction side of the air pressure source 29. The switch 46 is preferably a three-way, center open micro switch with an actuator link 48.

An operating arm 47 (see FIGS. 3 and 4) is provided at each rear wheel to actuate a link 48 in response to suspension deflection. The arm 47 is attached to the respective pivoted suspension arm 18, and has two spaced projecting (inflate/deflate) fingers 49a, 49b at the distal end.

As either suspension arm 18 swings upwardly, the respective operating arm 47 rises with respect to its actuating link 48. If this arm 47 has sufficient travel, the associated inflate finger 49a trips the respective link 48, actuating the associated switch 46. This switch 46 in turn energizes the associated inlet solenoid 38. And the exhaust solenoid 42 is energized in a similar manner by employing the deflate finger 49b (see FIG. 4).

Figure 5:
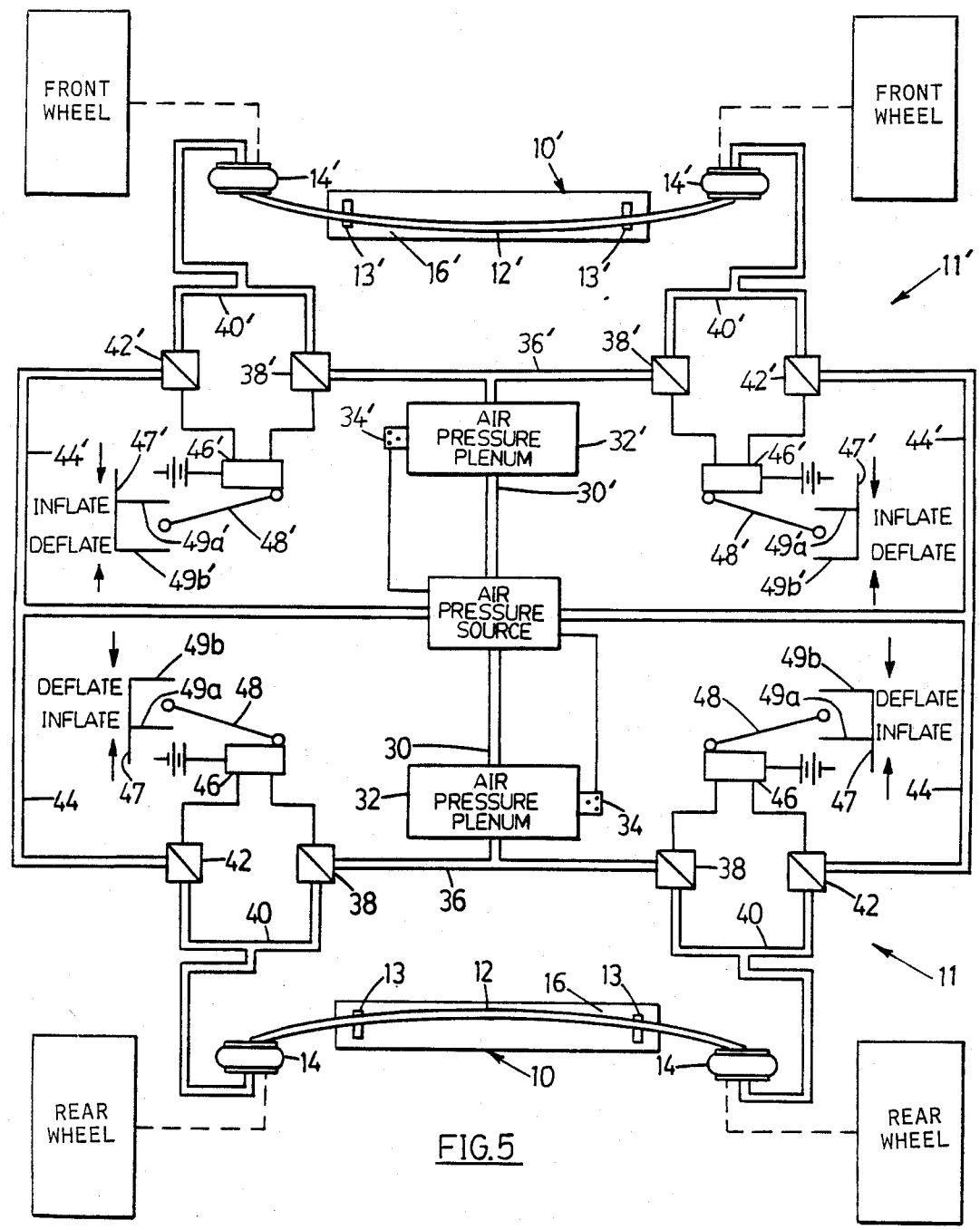
FIG. 5 is a schematic representation of the adaptive vehicle suspension system including control circuit of the present invention as installed on the front and rear of a vehicle.

The front suspension of the vehicle is provided with an adaptive system and control circuit like at the rear as described above and is shown in combination with the rear system in FIG. 5 (the parts in the front that correspond to those in the rear being identified by the same reference numbers but primed).

In operation, the control circuits 11 and 11' first senses and controls the vehicle height at each wheel. For example, when the vehicle is loaded with passengers the additional weight causes increased deflection of the springs thereby lowering height. The switches 46 and 46' energize the respective inlet solenoid valves 38 and 38' allowing pressurized air to enter the respective pneumatic springs 14 and 14'. As the air pressure builds in the pneumatic springs the vehicle height increases. When the pneumatic springs have inflated sufficiently to return the vehicle to its normal operating height, the switches 46 and 46' shut off the flow of pressurized air by closing the respective solenoid valves 38 and 38'.

Vehicle height at each wheel can also be changed independently. Thus, if more load is put on one corner than the other, only the appropriate one of the pneumatic springs 14 and 14' is inflated to level the vehicle. Furthermore, during unusual vehicle maneuvering providing dynamic uneven loading situations, such as hard vehicle cornering, one side of the vehicle may lower with respect to the other. The control circuits 11 and 11' sense this and respond by admitting pressurized air to the pneumatic spring 14 or 14' on the lower side. This instantly increases suspension height on that side causing the vehicle to once again level itself, providing improved cornering control. Once the load is removed or the cornering maneuver is completed, the vehicle height may exceed the desired nomral operating height. In response the switches 46 and 46' on this side energize the respective exhaust solenoid valves 42 and 42' to allow the pneumatic springs 14 and 14' on this side to partially deflate, lowering the suspension height.

In another important aspect of this invention, addition of air to each pneumatic spring 14 and 14' increases the spring rate at this wheel. The front and rear suspension systems 10 and 10' each have a low initial overall spring rate due to the pneumatic spring 14 (14'), and due to combining the transverse leaf spring 12 (12') in series therewith at each rear wheel. As the air pressure in eachpneumatic spring increases, the spring rate at this wheel correspondingly increases. As the road roughness increases, the transverse leaf spring is brought more into action, increasing the spring rate. This provides a better balance of ride comfort versus ride control than is obtainable by a conventional constant rate spring system, or systems with parallel spring components.

To illustrate, assume one of the vehicle wheels suddenly hits a bump. If the bump is of small amplitude, the pneumatic spring at this wheel absorbs the jolt relatively low initial pressure. This gives a very desirable soft feeling ride. Upon receiving a larger amplitude jolt, the vehicle suspension suddenly deflects, further bringing the leaf spring into action. This results in an increased spring rate and maximum ride comfort/control is obtained.

Finally, if cornering or other heavy loading is involved when the springing action is desired, the suspension control circuitry 11 and 11' senses this additional deflection and provides entry of more pressurized air into one or more of the pneumatic springs thereby increasing the spring rate. As the spring rate increases, the total suspension deflection decreases, thereby allowing the vehicle to smoothly take bumps without excessive body movement.

When the vehicle suspension no longer exhibits a need for an increased spring rate, the increased pressure in the respective pneumatic springs is released. This lowers the spring rate, and depending on the level of pressure released, simultaneously lowers the vehicle height. In this manner the vehicle suspension control circuit 11 constantly monitors vehicle operating conditions at the rear and responds by changing vehicle spring rate and/or vehicle height.

In summary, numerous benefits result from employing the concepts of the presention invention. The adaptive suspension system 10 and 10' provides variable suspension spring rate characteristics substantially instantaneously in response to vehicle operating conditions. The initial spring rate is low providing optimum ride quality. As suspension inputs increase, the spring rate also increases providing enhanced ride control. Since the respective height sensor switches react substantially instantaneously to suspension input, a rapid increase or decrease in spring rate and vehicle height is possible. Advantageously, the system provides a much better balance of ride comfort versus ride control than was previously obtainable with conventional constant rate springs or parallel spring systems.

The foregoing description of a preferred embodiment of the invention has been presented for purposes of illustration and description. It is not intended to be exhaustive or limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in varous embodiments and with various modifications as is suited to the particular use contemplated. All such modifications and variations are within the scope of the invention as determined by the appended claims when interpreted in accordance with the breadth to which they are fairly, legally, and equitably entitled.

The embodiments of the invention in which an exclusive property or privilege is claimed are defined as follows:

1. An adaptive suspension system for a motor vehicle providing variable spring rate characteristics comprising a frame, a pair of front wheels independently suspended on said frame, a front composite leaf spring extending transversely of and mounted on said frame between said front wheels, a separate front pneumatic spring means mounted between an end of said front spring and each of said front wheels so as to connect said front pneumatic spring means and said front leaf spring to operate solely in series between said frame and the respective front wheels, a pair of rear wheels independently suspended on said frame, a rear composite leaf spring extending transversely of and mounted on said frame between said rear wheels, a separate rear pneumatic spring means mounted between an end of said rear spring and each of said rear wheels so as to connect said rear pneumatic spring means and said rear spring to operate solely in series between said frame and the respective rear wheels, an air pressure source and a control circuit for separately regulating pressure from said source to each of said pneumatic spring means, said control circuit including separate sensing means for sensing the height of the vehicle at each of said wheels, each of said sensing means including means for respectively increasing and decreasing the pressure to the pneumatic spring means at each of said wheels in response to lowering and raising of the vehicle at the respective wheel whereby the combined spring rate of each of the pneumatic spring means and the associated leaf spring acting in series at each of said wheels is adjusted and controlled in response to road and vehicle conditions to control vehicle motion including vehicle roll and height at the front and rear wheels.

2. An adaptive suspension system for a motor vehicle providing variable spring rate characteristics comprising a frame, a pair of front wheels independently suspended on said frame, a front composite leaf spring extending transversely of and mounted on said frame between said front wheels, a separate front pneumatic spring means mounted between an end of said front spring and each of said front wheels so as to connect said front pneumatic spring means and said fronft leaf spring to operate solely in series between said frame and the respective front wheels, a pair of rear wheels independently suspended on said frame, a rear composite leaf spring extending transversely of and mounted on said frame between said rear wheels, a separate rear pneumatic spring means mounted between an end of said rear spring and each of said rear wheels so as to connect said rear pneumatic spring means and said rear spring to operate solely in series between said frame and the respective rear wheels, an air pressure source and a control circuit for separately regulating pressure from said source to each of said pneumatic spring means, said control circuit including separate sensing means for sensing the height of the vehicle at each of said wheels, each of said sensing means including a separate switch means for respectively increasing and decreasing the pressure to the pneumatic spring means at each of said wheels in response to lowering and raising of the vehicle at the respective wheel whereby the combined spring rate of each of the pneunmatic spring means and the associated leaf spring acting in series at each of said wheels is adjusted and controlled in response to road and vehicle conditions to control vehicle motion including vehicle roll and height at the front and rear wheels.

* * * * *